3,277,045
POLYPROPYLENE STABILIZED WITH SUBSTITUTED PYRIMIDINS

Alberto Bonvicini and Cornelio Caldo, Terni, Italy, assignors to Montecatini Società Generale per l'Industria Mineraria e Chimica, Milan, Italy, a corporation of Italy
No Drawing. Filed June 25, 1962, Ser. No. 205,129
Claims priority, application Italy, June 28, 1961, 11,901/61
9 Claims. (Cl. 260—45.8)

The present invention relates to stabilized polymeric compositions of poly-alpha olefins and to a process for stabilizing fibers, films and other manufactured articles made from crystalline alpha-olefin-polymers, particularly from polypropylene.

It is known that polyolefin materials undergo a certain amount of degradation during hot working thereof, particularly in the presence of atmospheric oxygen.

It is also known that articles manufactured from crystalline polyolefins are sensitive to the action of light and to thermal treatments.

This degradative action can be reduced by the addition of certain protective substances to the polymer, particularly during the preparation of fibers, films, etc., therefrom.

Suitable protective substances used heretofore have included small proportions of amines, aminophenols, chelates of transition metals (e.g. Ni), organotin compounds, triazo compounds, zinc compounds, dithiocarbamates, phenols, phosphites, mercaptans, oximes, polyquinolines, sulfur derivatives, silicones, thiophosphites, and the like.

We have now surprisingly found that thermally stable pyrimidines which have been substituted with functional groups, e.g., hydroxy, amino, sulfhydro, and the like, and possibly also with alkyl radicals, exert a high stabilizing action when mixed with the polymeric olefin in an amount up to about 2% by weight of the crystalline olefin polymer.

Particularly suitable substituted pyrimidines include:

1-methyl-2,4-dihydroxy-pyrimidine

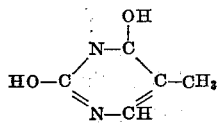

1-amino-2,4-dihydroxy-pyrimidine

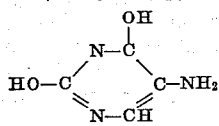

2-hydroxy-4-hydrosulfo-pyrimidine

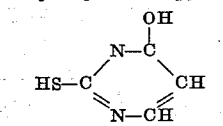

2,4-dihydroxy-pyrimidine

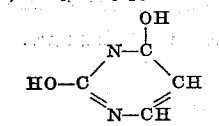

Thus, the present invention relates to polymeric compositions which are stable against the action of heat, aging and light, and which comprise a crystalline polyolefin, particularly polypropylene, and from about 0.02 to 2% by weight (based on the weight of the polyolefin) of a thermally stable pyrimidine which is substituted, e.g., with functional hydroxyl, amino, hydrosulfo groups and the like and possibly also with alkyl radicals.

The stabilized composition can be used in combination with other sttbilizers, e.g. ultra violet absorbers, with pigments, dyes, fillers and anti-acid substances such as inorganic salts of stearic acid.

The addition of an inorganic salt of stearic acid to the composition before spinning improves the stability characteristics of such polymeric compositions. An inorganic salt of stearic acid which is particularly suitable is calcium stearate.

The stabilizers of the present invention are also effective in the stabilization of compositions comprising crystalline polyolefins and basic nitrogen compounds (e.g., polyalkyleneimines, condensation products of dichloroethane with a polyfunctional amine, condensation products of epichlorohydrin with amines, polyvinylpyridine, etc.) which compositions can be used to produce fibers having improved tinctorial characteristic.

The stabilizers of the present invention can be used alone or in admixture with other stabilizing systems, e.g., with a dialkylphenol sulfide, particularly 4,4'-thio-bis-6-tertiary butylmetacresol, and a beta-thioether of a propionic acid ester, particularly lauryl thiodipropionate, or a thioester obtained from thiodiglycol and aliphatic acids.

The stabilizers and/or the above stabilizer mixes of the present invention are also suitable for the stabilization of compositions comprising crystalline polyolefins colored by the addition of organic or inorganic dyeing pigments to the polymer/stabilizer mixes before extrusion thereof.

The stabilized compositions of the present invention can be utilized to produce fibers, films, or manufactured articles.

The spinning of the compositions of the present invention is preferably carried out by extrusion through spinnerets with holes having a length to diameter ratio greater than 1.

The yarns, after spinning, are subjected to a stretching treatment with a stretching ratio of from about 1:2 and 1:10 at a temperature of from about 80 to 150° C., in a stretching device which is heated with hot air, steam or a similar fluid, or which is provided with a heating plate.

The addition of the stabilizing compounds of the invention is generally carried out by mixing such compounds with the polyolefin while agitating.

The stabilizers can also be added, however, by other methods, e.g., by mixing the polyolefin with a solution of the stabilizer in a suitable solvent and then evaporating off the solvent, or by adding the stabilizer to the polyolefin at the end of the polymerization. It is also possible to obtain the stabilizing action by applying the stabilizing compounds onto a manufactured article, e.g., by immersing the article in a stabilizer solution or dispersion and then evaporating off the solvent.

The stabilizing compounds of the present invention exhibit a good compatibility with polyolefins in the molten state and have no staining action.

The stabilized compositions of the present invention are particularly suitable for preparing mono- and plurifilaments, staple, dyeable yarns, bulky yarns, films, tapes,, shaped articles and the like.

The following examples will further illustrate the invention.

The polymer used in these examples was prepared with stereospecific catalysts prepared from a alkyl aluminum compound and a crystalline transition metal halide.

Examples 1-4

The data relating to these examples are reported in Table 1.

TABLE 1

|  | Ex. 1 | Ex. 2 | Ex. 3 | Ex. 4 |
|---|---|---|---|---|
| Composition of the mix: | | | | |
| a. Polypropylene: | | | | |
|   Intrinsic Viscosity ($\eta$), determined in tetra-hydronaphthalene at 135° C | 1.48 | 1.48 | 1.48 | 1.48 |
|   Ash content, percent | 0.035 | 0.035 | 0.035 | 0.035 |
|   Residue from heptane extraction, percent | 95.3 | 95.3 | 95.3 | 95.3 |
| b. Stabilizer and percent thereof | (1) | (2) | (3) | |
| Type of mixer | (4) | (4) | (4) | (4) |
| Color of the mix when molten in a test tube at 250° C. for 10 minutes | (5) | (5) | (5) | (5) |
| Spinning conditions: | | | | |
|   Screw temperture, ° C | 200 | 200 | 200 | 200 |
|   Head temperature, ° C | 220 | 220 | 220 | 220 |
|   Spinneret temperature, ° C | 220 | 220 | 220 | 220 |
|   Spinneret type, mm | 40/0.5×10 | 40/0.5×10 | 40/0.5×10 | 40/0.5×10 |
|   Max. pressure (Kg./cm.) | 45 | 45 | 45 | 45 |
|   Winding speed (meters/minute) | 400 | 400 | 400 | 400 |
| Stretching conditions: | | | | |
|   Temperature, ° C | 130 | 130 | 130 | 130 |
|   Medium | (6) | (6) | (6) | (6) |
|   Stretching ratio | 1:5 | 1:5 | 1:5 | 1:5 |
| Characteristics of the stretched yarn: | | | | |
|   Tenacity (g./den.) | 5.86 | 5.7 | 5.65 | 5.5 |
|   Elongation, percent | 21 | 19 | 19 | 23 |
| Thermal degradation,[7] percent | 73 | 82 | 80 | 71 |
| Stability to accelerated thermal aging,[8] percent | 84 | 93 | 42 | (9) |
| Stability to sun light,[10] percent | 50 | | | 33 |
| Stability to artificial light,[11] percent | 51 | 50 | 58 | 37 |

[1] 1-amino-2,4-dihydroxypyrimidine.
[2] 2-hydroxy-4-hydrosulfopyrimidine.
[3] 2,4-dihydroxypyrimidine 0.5%.
[4] Henschel.
[5] Clear.
[6] Steam.
[7] Percent decrease of the intrinsic viscosity upon extrusion.
[8] Percent residual tenacity after exposure at 120° C. in an air-circulation oven for 15 hours.
[9] Brittle.
[10] Residual tenacity after exposure to summer sun light for 200 hrs.
[11] Residual tenacity after exposure to a mercury lamp for 20 hrs.

Variations can of course be made without departing from the spirit of the invention.

Having thus described our invention, what we desire to secure and hereby claim by Letters Patent is:

1. A polymeric composition which is stable against the action of heat, aging and light, comprising polypropylene and a substituted pyrimidine of the formula wherein R is selected from the group consisting of hydrogen, amino, and lower alkyl, and wherein R' is selected from the group consisting of hydroxyl and hydrosulfo, the amount of said substituted pyrimidine being from about 0.02 to 2% based on the weight of said polypropylene.

2. The polymeric composition of claim 1 wherein the amount of said substituted pyrimidine is from about 0.2 to 1% based on the weight of said polypropylene.

3. The polymeric composition of claim 1 wherein the substituted pyrimidine is 1-methyl-2,4-dihydroxy-pyrimidine.

4. The polymeric composition of claim 1 wherein the substituted pyrimidine is 1-amino-2,4-dihydroxy-pyrimidine.

5. The polymeric composition of claim 1 wherein the substituted pyrimidine is 2-hydroxy-4-hydrosulfo-pyrimidine.

6. The polymeric composition of claim 1 wherein the substituted pyrimidine is 2,4-dihydroxy-pyrimidine.

7. The product of claim 1 in film form.

8. The product of claim 1 in filamentary form.

9. A method of preparing a polymeric composition which is stable against the effects of heat, ageing and light, this method comprising dissolving in a solvent a substituted pyrimidine of the formula wherein R is selected from the group consisting of hydrogen, amino, and lower alkyl, and wherein R' is selected from the group consisting of hydroxyl and hydrosulfo, to thereby form a solution, mixing said solution with polypropylene, and evaporating said solvent, the proportions as between said solution and said polypropylene being such as to result in a composition containing from about 0.02 to 2%, expressed on a dry basis, of said substituted pyrimidine, based on the weight of said polypropylene.

References Cited by the Examiner

UNITED STATES PATENTS 2,658,895  11/1953  Ballard et al. _____ 260—251
2,985,617  5/1961   Salyer et al. _____ 260—45.9

FOREIGN PATENTS 1,172,602  10/1958  France.

LEON J. BERCOVITZ, *Primary Examiner.*

H. E. TAYLOR, *Assistant Examiner.*